United States Patent [19]
Bothwell

[11] Patent Number: 5,607,306
[45] Date of Patent: Mar. 4, 1997

[54] METHOD AND APPARATUS FOR TRAINING

[75] Inventor: Robert L. Bothwell, Fort Worth, Tex.

[73] Assignee: Lockheed Fort Worth Company, Fort Worth, Tex.

[21] Appl. No.: 326,709

[22] Filed: Oct. 20, 1994

[51] Int. Cl.⁶ .............................. G09B 9/02; G09B 19/16
[52] U.S. Cl. ................. 434/29; 434/30; 434/49; 434/372; 395/326; 345/146
[58] Field of Search ................. 434/14, 29, 30, 434/38, 43–45, 49, 55, 59, 307 R, 308, 365, 372; 340/945; 395/157, 155; 364/578; 348/146, 119

[56] References Cited

U.S. PATENT DOCUMENTS

| | | |
|---|---|---|
| 3,515,802 | 6/1970 | Wise . |
| 3,996,672 | 12/1976 | Osofsky et al. . |
| 4,016,658 | 4/1977 | Porter et al. . |
| 4,027,403 | 6/1977 | Marsh et al. . |
| 4,078,317 | 3/1978 | Wheatley et al. . |
| 4,238,792 | 12/1980 | Cohen et al. . |
| 4,286,289 | 8/1981 | Ottesen et al. . |
| 4,313,726 | 2/1982 | Chase . |
| 4,424,038 | 1/1984 | Tingleff et al. . |
| 4,587,630 | 5/1986 | Straton et al. . |
| 4,641,255 | 2/1987 | Hohmann . |
| 4,672,438 | 6/1987 | Plante et al. . |
| 4,710,128 | 12/1987 | Wachsmuth et al. ................. 434/59 X |
| 4,767,334 | 8/1988 | Thorne et al. . |
| 4,842,520 | 6/1989 | Dupont . |
| 4,845,495 | 7/1989 | Bollard et al. ....................... 340/945 X |
| 4,845,645 | 7/1989 | Matin et al. ......................... 434/372 X |
| 4,853,883 | 8/1989 | Nickles et al. ....................... 434/29 X |
| 5,009,598 | 4/1991 | Bennington . |
| 5,017,141 | 5/1991 | Relf et al. ............................ 434/30 X |
| 5,051,094 | 9/1991 | Richter et al. . |
| 5,105,220 | 4/1992 | Knodt et al. . |
| 5,176,520 | 1/1993 | Hamilton . |
| 5,184,956 | 2/1993 | Langlais et al. . |
| 5,224,861 | 7/1993 | Glass et al. . |
| 5,260,874 | 11/1993 | Berner et al. . |
| 5,286,202 | 2/1994 | de Gyrafas et al. . |
| 5,316,480 | 5/1994 | Ellsworth . |
| 5,321,602 | 6/1994 | Francisco . |
| 5,354,202 | 10/1994 | Moncrief et al. . |

*Primary Examiner*—Joe Cheng
*Attorney, Agent, or Firm*—Baker & Botts, L.L.P.

[57] ABSTRACT

A method and apparatus for training are provided in which a training system (10) includes indicators and controls (12) for interfacing with a trainee. A display (16) is used to display graphical representations of operating conditions. By selecting locations on the display (16), the training system (10) is configured to correspond with the operating conditions associated with the selected locations on the display (16).

17 Claims, 6 Drawing Sheets

FIG. 2

| MISSILE | GP/STORE | LINE | STATION LOADING — LOOKING FORWARD | | | | | | | | | CARRIAGE | | | | EMPLOYMENT OR SELECTIVE JETTISON | | | JETTISON ④ | | | DRAG INDEX/ CONFIG WEIGHT ② | REVERT TO LINE ③ |
|---|---|---|---|---|---|---|---|---|---|---|---|---|---|---|---|---|---|---|---|---|---|---|---|
| | | | 1 | 2 | 3 | 4 | 5 | 6 | 7 | 8 | 9 | MAX KIAS/ MACH | MAX ACCEL G ① SYM +/- | ROLL +/- | LOAD- ING CATE- GORY | MAX KIAS/ MACH | MAX ACCEL G | CLIMB/ DIVE ANGLE- DEGREES | SELECTIVE AUX SPNSN MAX KIAS/ MACH | FUEL TANKS MAX KIAS/ MACH | EMER- GENCY MAX KIAS/ MACH | | |
| AIM-9 | 10.01. | 1 | ⑨ | | | | ⑧ | | | | ⑨ | A/C | 9.0 / -3 | 6.0 / -1 | I | A/C | 0.0 TO 6.5 | A/C | NA | NA | NA | 22 / 1013 | — |
| | | 2 | ⑨ | ⑨ | | | ⑧ | | | | ⑨ | | | | | | | | | | | 43 / 1599 | — |
| | | 3 | ⑨ | ⑨ OPT | | | | | ⑧ | ⑨ OPT | ⑨ | | 8.5 / -3 | 5.5 / -1 | III | | | | | | | 54 / 1832 | — |
| | | 4 | ⑨ | | | | | | | ⑨ OPT | ⑨ | | 9.0 / -3 | 6.0 / -1 | I | | | | | | | 0 / 390 | — |
| | | 5 | ⑨ | ⑨ | | | ③⓪⓪ | | | | ⑨ | 600 1.6 | 7.0 (9.0) / -2 (-3) | 5.5 (6.0) / -1 | | 600 1.6 | | | | | | 22 / 2895 | — |
| | | 6 | ⑨ | ⑨ | | | ③⓪⓪ | | ⑧ | ⑨ | ⑨ | | | | | | | | | | | 43 / 3481 | — |
| | | 7 | ⑨ | ⑨ OPT | | | ③⓪⓪ | | ⑧ | ⑨ OPT | ⑨ | | 7.0 (8.5) / -1 | 5.5 / -1 | III | | | | | 600 1.6 | 600 1.6 | 76 / 4337 | — |

REMARKS:

DEPTH

SPEED

PRESSURE

TEMPERATURE

METHOD AND APPARATUS FOR TRAINING

TECHNICAL FIELD OF THE INVENTION

This invention relates generally to training systems, and more particularly to a method and apparatus for training.

BACKGROUND OF THE INVENTION

In many situations it is either impractical or impossible to provide training in the actual working environment. For example, with jet aircraft, training of new pilots and continued training of more experienced pilots cannot practically be accomplished with the aircraft itself.

Therefore, training simulators, such as flight simulators, have been developed. Ideally, such training systems provide exact replicas of the actual working environment, and provide real-life audio-visual experiences. Simulators are useful in a wide range of applications, such as for training in aircraft, boats, automobiles, trucks, buses, trains, power plants, chemical plants, or any other application calling for operator training.

These training systems typically include switches, buttons, gauges, meters, and other controls (which may be actual or computer representations) for simulating the actual controls used in the working environment. For training systems such as those used for jet aircraft, a visual display of ground terrain, the horizon, and the sky is also provided. In operation, these training systems simulate actual conditions in response to the trainees' use of the simulator controls. In this way, valuable training may be provided without the cost associated with, for example, actually flying a jet aircraft.

Instructors are often involved in the use of such training systems. These instructors monitor trainee performance, and can provide testing, instruction, and critique. For example, by setting the training system into a preset state, a trainee may be tested for response to a particular scenario, for example, recovery from a tailspin. However, instructors are not always necessary, and trainees may also set the training system to a desired state.

Such training systems are typically used in connection with training for dangerous and expensive equipment, such as jet fighter aircraft. Precise operating procedures for such equipment is often thoroughly documented in written manuals, which are studied by the trainees, both for training and mission planning. For example, operating procedures and information for fighter aircraft are provided in flight manuals, often referred to as technical orders (or "TOs"). Similarly, procedures for operating nuclear plants are precisely and exhaustively documented in various operating procedure documents.

Trainees are often very familiar with this written information, which may include graphics such as charts and graphs, and its layout and appearance in the written document. For example, a typical TO for a fighter aircraft includes charts that provide information on proper weapons loading. Each line of the chart describes where various kinds of weapons should be attached to the aircraft. For example, one line may describe where air-to-air missiles of a particular kind should be attached for a weapons load of all air-to-air missiles. Another line of such a chart may describe where air-to-surface missiles should be attached to the aircraft for a weapons load of all air-to-surface missiles.

The trainees' knowledge and familiarity with such written procedures and charts and graphs is a valuable resource, and a need has arisen for a method and apparatus for training which makes use of the trainees' knowledge of such written materials. Furthermore, a need has arisen for a method and apparatus for graphically displaying and controlling operating conditions in training systems.

SUMMARY OF THE INVENTION

In accordance with the teachings of the present invention, a method and an apparatus for training are provided which substantially eliminate or reduce disadvantages and problems associated with prior training systems.

In particular, a training system is provided in which a trainee interface is used to interface the training system with a trainee. A processor is coupled to the trainee interface and executes a training program to control the training system. A display is coupled to the processor, the display displaying a graphical representation of operating conditions. Different locations on the graphical representation correspond to different operating conditions, such that the processor controls the training system to correspond to the operating conditions associated with a selected location. In a particular embodiment, the training system is a flight simulator.

In another embodiment of the present invention, a training system is provided in which a trainee interface is used to interface the training system with a trainee. A processor is coupled to the trainee interface and executes a training program to control the training program. A display is coupled to the processor, and displays a representation of operating conditions in a form substantially corresponding to a representation in a written operations manual. Different locations on the representation of operating conditions correspond to different operating conditions, such that the processor controls the training system to correspond to the operating conditions associated with the selected location. In a particular embodiment, the training system is a flight simulator.

Furthermore, a method of training is provided in which a training system is interfaced with a trainee. Graphical representations of operating conditions are displayed on a display, with different locations on the graphical representation corresponding to different operating conditions. Selection of a location on the graphical representation controls the training system to correspond to the operating conditions associated with the selected location.

An important technical advantage of the present invention is that graphical representations of operating conditions are displayed, and thus by selecting locations on the display, a training system is configured with the operating condition associated with the selected locations.

Another important technical advantage of the present invention is that the graphical representations may correspond to the form of written operation manuals, thereby taking advantage of trainees' knowledge of these written manuals during the training process.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 illustrates a weapon load chart from a flight manual;

DETAILED DESCRIPTION OF THE INVENTION

Figure 1:
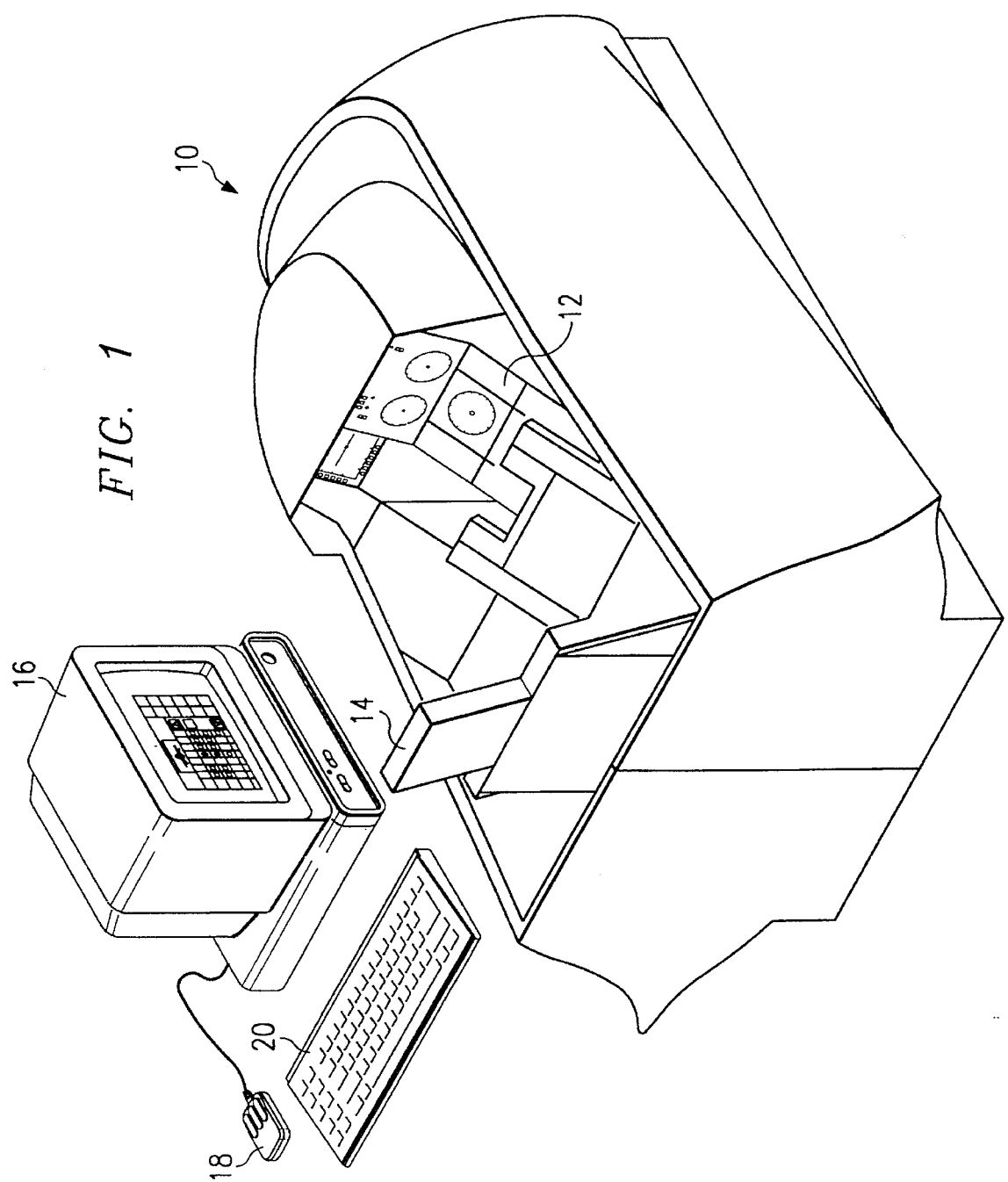
FIG. 1 illustrates an exemplary training system.

FIG. 1 illustrates an exemplary training system according to the teachings of the present invention. As shown in FIG. 1, a training system 10 includes operator indicators and controls 12 and trainee seat 14. The indicators and controls are an interface between the training system 10 and the trainee. Also included within training system 10 is display 16. More than one display may also be used. Display 16 may comprise a touch screen, as will be discussed below. Training system 10 is controlled in part by interaction with a graphical user interface on display 16. This interaction may be accomplished through use of a touch screen, a mouse 18, a keyboard 20, or any other input device, or combination of such devices. Those shown in FIG. 1 are exemplary only.

As shown in FIG. 1, an example of training system 10 is a flight simulator, which is configured as a cockpit. This particular example is exemplary only, and the present invention may include many other types of training systems without departing from the intended scope herein. For example, the present invention may include training systems for power plants, boats, buses, trucks, or any other application that may call for operator training through the use of training systems.

The use of touch screens with the present invention is most advantageous, as trainees often wear gloves to simulate actual conditions. These gloves may make it difficult to operate a mouse, keyboard, or other input. However, it should be understood that touch screens need not be used, and the present invention can be implemented with such other input devices.

Figure 3:
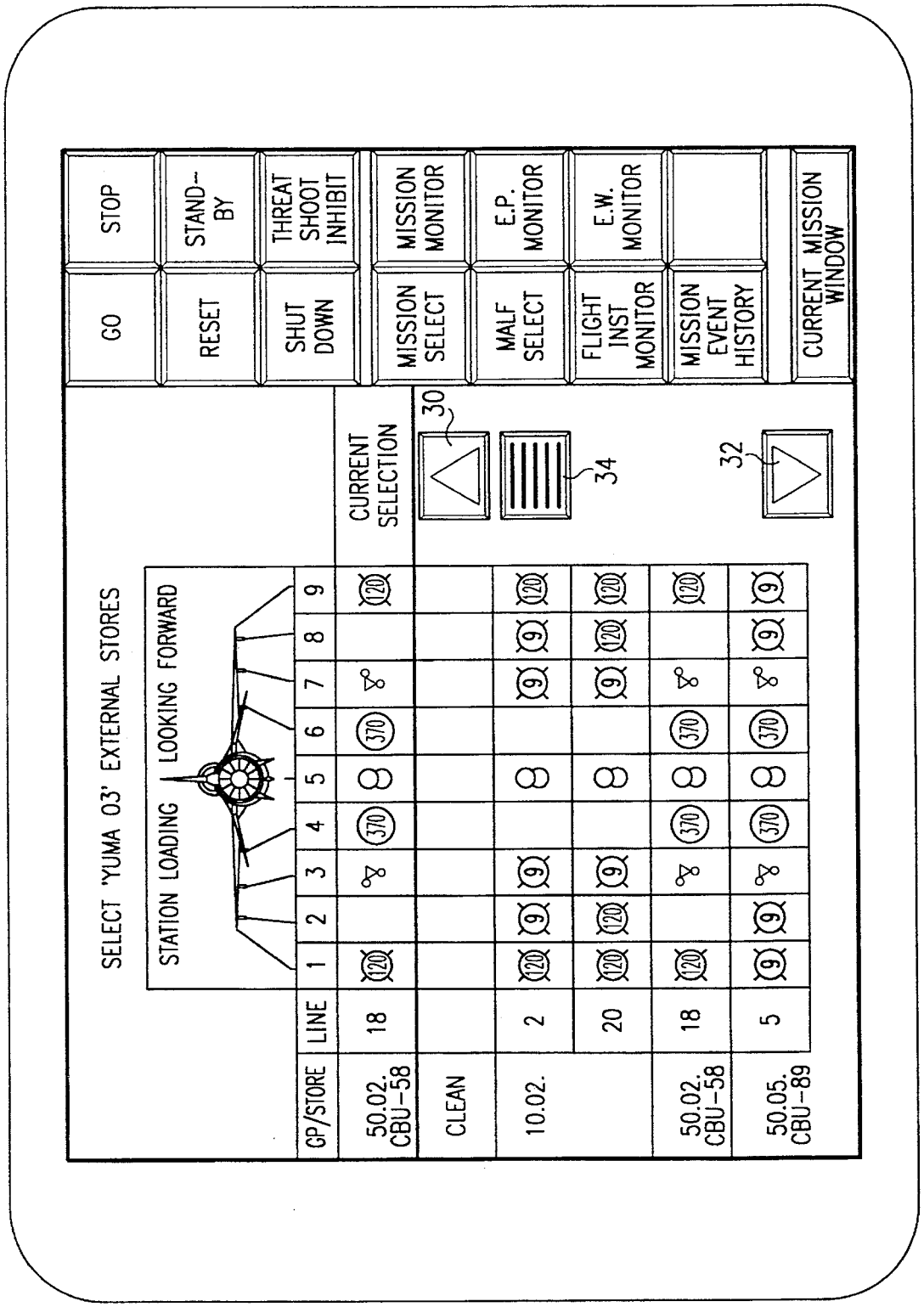
FIG. 3 illustrates a touch screen for weapons loading according to the teachings of the present invention.
Figures 4, 6, 8:
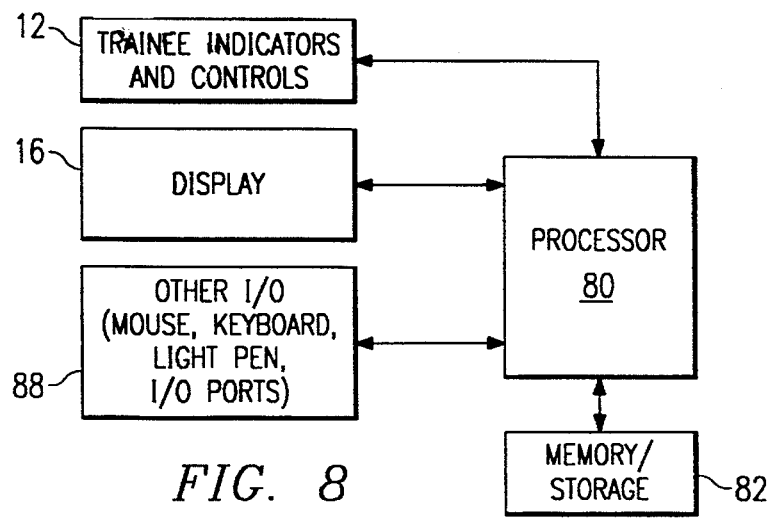
FIG. 4 illustrates a depth/speed graph from a submarine operations guide.
FIG. 6 illustrates a pressure/temperature graph from an operations manual.
FIG. 8 illustrates a block diagram of a training system according to the teachings of the present invention.

FIGS. 2, 4, and 6 illustrate exemplary charts and graphs that may appear in written manuals, product descriptions, operations guides, or any other document (generally referred to herein as operations manuals) used in connection with systems for which training may be desired. Such operations manuals are often used in training and mission planning, for example. The particular chart shown in FIG. 2, which is exemplary only, is part of a weapons load chart found in a TO for a jet fighter. The actual chart includes many more lines, those shown being exemplary. As shown in FIG. 2, various weapons loads are represented by each line of the chart. For different weapons loads, the aircraft has different performance characteristics, such as maximum acceleration and drag index. With the present invention, key elements of the chart, shown partially in FIG. 2, are displayed on the display 16 substantially the same as they appear in the written TO, as shown in FIG. 3. Thus, by providing for interaction with the display 16, a particular line of the chart corresponding to a weapons load can be quickly and easily selected, by either the trainee or the instructor. By making this selection, the training system 10 is automatically configured to correspond to the flight characteristics corresponding to that weapons load.

By displaying graphical information, and by recreating information from written documentation in substantially the same form on the display 16, significant advantages result. For example, the training system 10 can be quickly and easily configured to a particular state by the simple task of selecting a location on the graphical display. As discussed, this selection can be through a touch screen, or by use of other input devices, such as mouse 18 or keyboard 20. Furthermore, the consequences of particular operating conditions (such as a particular weapons load) is made clearer to the trainee because of the use of graphics, thus increasing the effectiveness of the training system.

FIG. 3 illustrates an exemplary display on display 16 according to the teachings of the present invention. The display shown in FIG. 3 corresponds to particular lines of the weapons load chart shown partially in FIG. 2. As shown in FIG. 3, the weapons load lines are recreated on the display 16, along with the graphic of the fighter craft. As shown in FIG. 3, a particular weapons load is selected by selecting the appropriate line. This selection can be performed by selecting the appropriate box in the column labeled "line." This box can be selected, for example, by touching a touch screen, or using a mouse or keyboard, among other input devices. The selected line can be highlighted. Furthermore, the appropriate line can be selected by selecting any place on the appropriate line, not just the "line box." It should be understood that selection of the lines can be accomplished in other ways as well without departing from the intended scope herein.

Scroll buttons 30, 32, and 34 are used to scroll up and down between all available lines. Only a few of the many possible weapons loads are shown in FIG. 3. For example, by scrolling up, the weapons load lines shown in FIG. 2 will appear on display 16.

On the display of FIG. 3, the line entitled "current selection" corresponds to the currently selected weapons load. The icons (or buttons) shown on the right side of the display 16 provide "general" commands that may be used for general control or operation of the training system 10. For example, the go and stop buttons can be used to start and stop a particular flight simulation, for example, by a trainee or by an instructor who may desire to periodically stop the flight simulation to provide critique or instruction. These "general" buttons are exemplary only, and need not be included. The function of the "general" buttons will depend upon the type of training system involved. The "current mission window" is used to list the name of the current mission being simulated.

As another example, FIG. 4 illustrates a depth/speed chart that is common in operations manuals for submarines. For safest operation, submarines should be operated at the depths and speeds that fall within the envelope curves shown in FIG. 4. Operation outside of this envelope can lead to dangerous or inefficient operation. Therefore, submarine operators are trained to maintain operation within the envelopes shown in FIG. 4.

Figure 5:
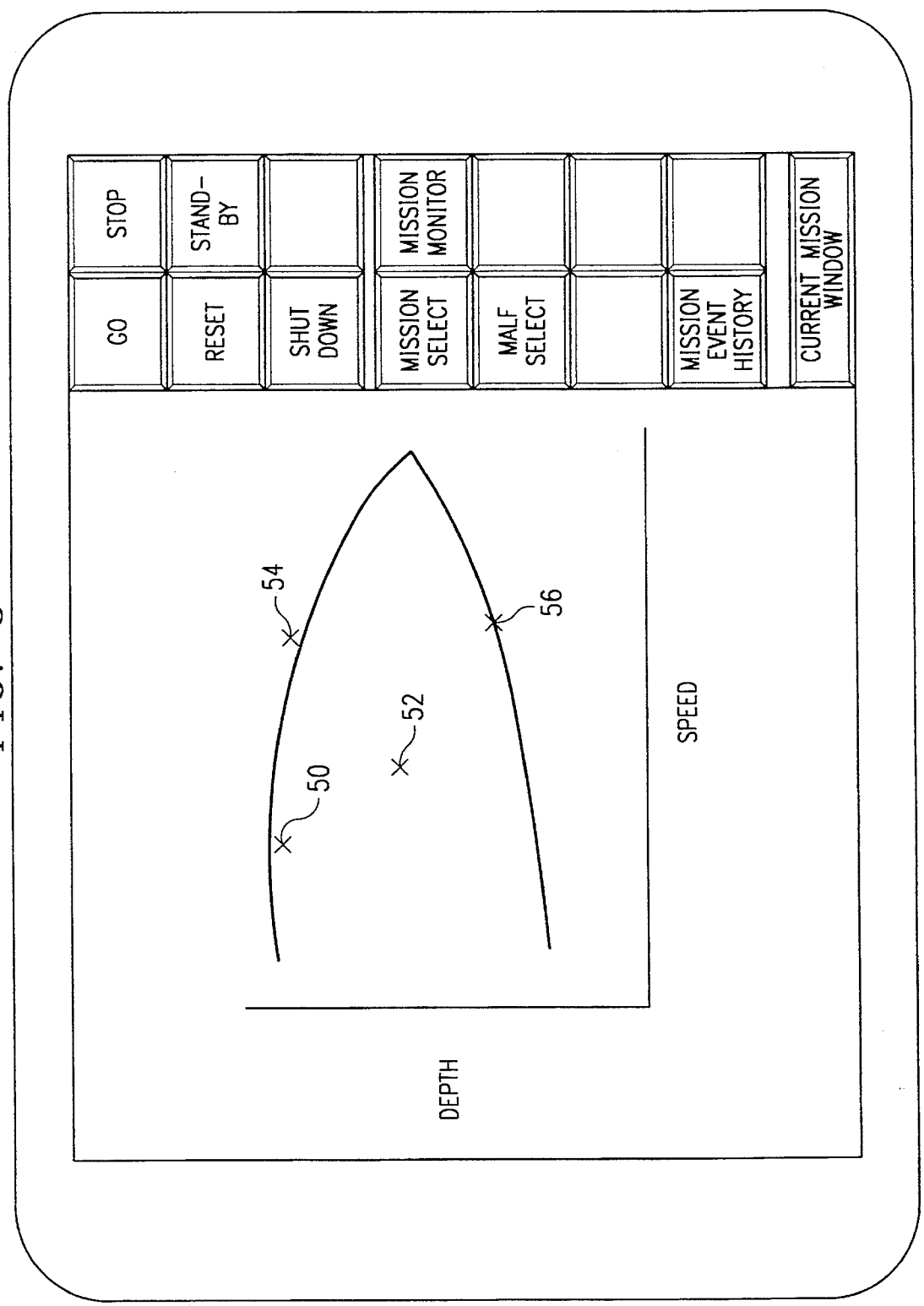
FIG. 5 illustrates a touch screen for depth/speed operating conditions according to the teachings of the present invention.

As shown in FIG. 5, the depth/speed chart shown in FIG. 4 is recreated on a display used in a training system for submarine operators. With the display shown in FIG. 5, a trainee or instructor may simply select any location on the chart, and the depth and speed being simulated by the training system will correspond to the point selected on the graph. For example, locations 50–56 represent various points of operation within, on the edge of, and outside the envelope shown in the graph of FIGS. 4 and 5. With this graphical interface, a trainee may be trained efficiently and effectively in maintaining safe operation, or in returning the submarine to safe operation.

As discussed above, by placing graphs such as that shown in FIGS. 4 and 5 on a display, significant increases and effective training results. The use of graphics to convey information is often more efficient and effective than the use of textual information. For example, the graph shown in FIGS. 4 and 5 is helpful in conveying to submarine trainees the conditions necessary for safe operation. By placing such graphical information on a display, and thereby allowing training through interaction with the graphical representation, effective training is significantly enhanced. Furthermore, setting the training system to a particular state is made much more efficient by allowing interaction with graphical representations such as that shown in FIGS. 4 and 5.

Figure 7:
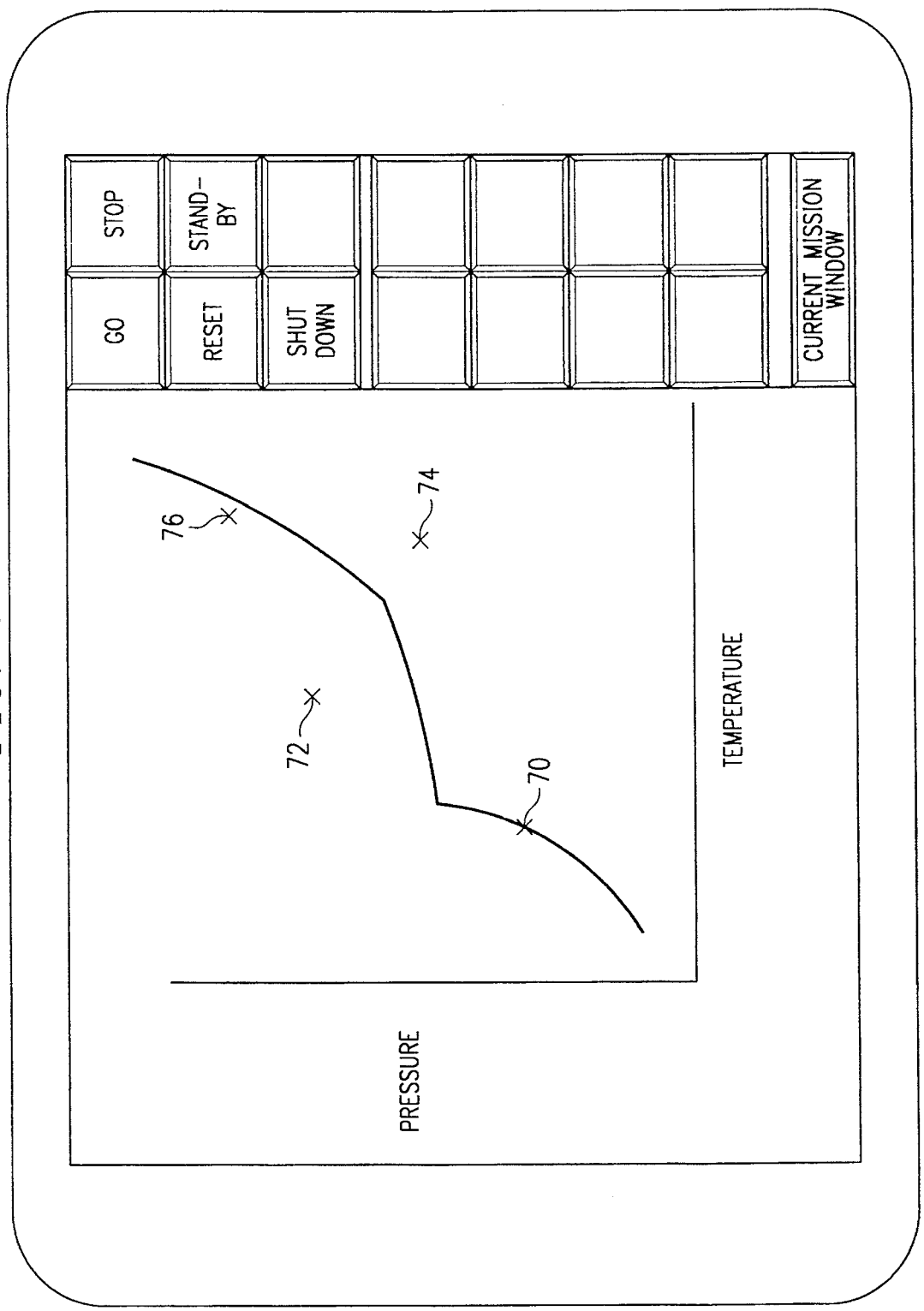
FIG. 7 illustrates a touch screen for pressure/temperature operating conditions according to the teachings of the present invention.

FIGS. 6 and 7 illustrate another graph that may be found in an operations manual, and a corresponding display that may be used as part of a training system according to the present invention. The particular graphs shown in FIGS. 6 and 7 illustrate the relationship between pressure and temperature of a particular process, which may be the process of chemical or nuclear reaction, for example. It may be that for safe or effective operation, the pressure and temperature relationship should always be above the graph line shown in FIGS. 6 and 7. Thus, similarly to the submarine example discussed in FIGS. 4 and 5, particular locations can be chosen on the graph, and the simulated process would then correspond to that temperature and pressure. As an example, points 70–76 may be selected to allow for training at operating conditions above, on, or below the appropriate line.

As discussed above, selection of locations such as in FIGS. 5 and 7 may be accomplished with devices such as a touch screen, a mouse, a keyboard, or a light pen, without departing from the intended scope herein. Also, combinations of these or other devices may be used, as with the other examples.

It should be understood that the particular examples discussed in connection with FIGS. 2 through 7 are exemplary only, and any graphical representations that will be helpful in the training process may be used with training systems without departing from the intended scope of the present invention. For example, the graphical representation could be a map, with the location of the trainee's aircraft, or other aircraft, being selectable as described above. These examples have been provided to show how the present invention may be implemented in connection with the training systems, and to highlight its advantages. Furthermore, the representations displayed on display 16 need not be based on written documentation, although basing the representations on written documentation provides the advantages mentioned above.

FIG. 8 illustrates a block diagram of a control system for controlling a training system 10 according to the teachings of the present invention. As shown in FIG. 8, a processor 80 is coupled to memory/storage 82, indicators and controls 12, display 16, and other I/O 88.

The processor 80 may comprise a microprocessor, computer system (such as a personal computer), or any other computer or processing system suitable for executing instructions for implementing a control system. As an example, an R4000 based multiprocessor system from the Silicon Graphics company may be used to control and operate the training system 10. In operation, processor 80 operates on instructions, which may be stored, for example, in memory/storage 82. Memory/storage 82 may be part of the system that comprises processor 80. The instructions executed by processor 80 include a training program for presenting simulated operations that correspond to the operating conditions selected through interaction with display 16. Memory/storage 82 may include random access memory, read only memory, magnetic storage media, among others. Instructions and data may be retrieved from and stored in memory/storage 82.

Processor 80 also controls and receives input from the indicators and controls 12. Such indicators and controls include switches, gauges, meters, heads-up displays, visual displays (such as terrain and horizon views) and any other such devices that are used as part of a training system. For example, with a flight simulator, the trainee indicators and controls will include all of the cockpit equipment that the trainee has at his disposal, as well as the visual display used to show the terrain and horizon.

Processor 80 is also coupled to display 16. As discussed above, display 16 includes the graphical representations of operating conditions that are used to increase the efficiency and effectiveness of the training system. Display 16 may be a touch screen.

Other I/O 88 includes other input/output devices used to communicate with processor 80, such as a mouse, keyboard, light pen, or other I/O ports. Such controls are provided to allow processor 80 to control the operation of the training system in ways alternative to a touch screen.

In summary, a method and apparatus for training has been provided in which graphical representations of operating conditions are displayed on a display. These representations may be based upon written operations manuals. Such displays allow for increased effectiveness in training through the use of graphical information, as well as for ease in configuring training systems for particular conditions. Furthermore, understanding of the graphical representations that may appear in written documentation is reinforced.

Although the present invention has been described in detail, it should be understood the various changes, substitutions, or additions may be made without departing from the intended scope as defined by the appended claims.

What is claimed is:

1. A vehicle training system for training a trainee to operate a vehicle, comprising:

a trainee interface operable to interface the vehicle training system with a trainee;

a processor coupled to the trainee interface and operable to execute a training program to control the vehicle training system to simulate vehicle operation based on input by the trainee; and a display coupled to the processor, the display operable to display a graphical representation of vehicle weapons loads with different locations on the graphical representation corresponding to different weapons loads of the vehicle the trainee is training to operate, such that the vehicle weapons loads are displayed on the display in a format similar to that contained in a written weapons load technical order for the vehicle, where the weapons loads technical order has been used in training of the trainee, wherein the processor controls the vehicle training system to simulate vehicle operation according to weapons loads corresponding to the locations on the display selected by the trainee.

2. The training system of claim 1, wherein the display comprises a touch screen.

3. The training system of claim 1, wherein a plurality of operating conditions correspond to a selected location.

4. The training system of claim 1, wherein the graphical representation comprises a chart.

5. The training system of claim 1, wherein the graphical representation comprises a graph.

6. The training system of claim 1, wherein the training system comprises a flight simulator.

7. A training system, comprising:

a trainee interface operable to interface the training system with a trainee;

a processor coupled to the trainee interface and operable to execute a training program to control the training system and further operable to receive input from the trainee and manipulate the input from the trainee without further trainee interface such that the processor controls the training system to correspond to the operating conditions associated with a selected location based on the input from the trainee to simulate system operation based on the operating conditions input by the trainee; and a display coupled the processor, the display operable to display a representation of operating conditions based upon the input by the trainee, in a form substantially corresponding to a representation in a technical order for the system, with different locations on the representation of operating conditions corresponding to different operating conditions; and wherein the displayed representation of operating conditions comprises weapons load conditions displayed in a format similar to that contained in the technical order on weapons loads for the system.

8. The training system of claim 7, wherein the display comprises a touch screen.

9. The training system of claim 7, wherein a plurality of operating conditions correspond to a selected location.

10. The training system of claim 7, wherein the representation of operating conditions comprises a chart.

11. The training system of claim 7, wherein the representation of operating conditions comprises a graph.

12. The training system of claim 7, wherein the training system comprises a flight simulator.

13. A method of training, comprising:

interfacing a training system with a trainee;

displaying a graphical representation of weapons loads, with different locations on the graphical representation corresponding to different weapons loads, in a format similar to that contained in a written weapons load technical order for the system the trainee is training to operate;

inputting data corresponding to a selected location on the graphical representation; and controlling the training system to correspond to the weapons load conditions associated with the selected location based on the input data to simulate system operation based on the selected weapons load conditions.

14. The method of claim 13, wherein the step of selecting comprises a touch screen.

15. The method of claim 13, wherein the graphical representation is in a form substantially corresponding to a representation in a written operations manual.

16. The method of claim 13, wherein the graphical representation comprises a chart.

17. The method of claim 13 wherein displaying a graphical representation of operating conditions further comprises displaying a graphical representation of weapons loads in a format similar to that contained in a weapons loads technical order for the system, where the weapons loads technical order has been preciously used to train the trainee.

* * * * *